April 1, 1969 — R. E. FRENCH — 3,436,147
CAMERA EXPOSURE CONTROL ARRANGEMENTS
Original Filed March 20, 1962 — Sheet 1 of 4

United States Patent Office 3,436,147
Patented Apr. 1, 1969

3,436,147
CAMERA EXPOSURE CONTROL ARRANGEMENTS
Robert E. French, Weston, Mass., assignor, by mesne assignments, to Atlas-Rand Corporation, Clifton, N.J., a corporation of New Jersey
Continuation of application Ser. No. 181,101, Mar. 20, 1962. This application Dec. 7, 1965, Ser. No. 517,151
Int. Cl. G03b 7/10
U.S. Cl. 352—141       10 Claims

ABSTRACT OF THE DISCLOSURE

A motion picture camera includes a lens system in which is disposed a stationary vane structure that includes two tabs that are mounted substantially on the arcuate center line of the aperture of a cooperating movable vane that is driven by a galvanometer. Mounted immediately in front of each tab is a 0.094″ x 0.094″ mirror. Light is reflected by the upper mirror into a viewfinder system and by the lower mirror onto a photoconductor which controls the galvanometer.

---

This application is a continuation of my pending application, Ser. No. 181,101, filed Mar. 20, 1962, and now abandoned.

This invention relates to image recording devices and more particularly to camera control arrangements which operate as a function of the light transmitted through the main lens system of the camera.

It is desirable to control the operation of a camera in accordance with what the image recording medium actually sees as more accurate information can be obtained, for example, in the view finding operation or in controlling the size of the aperture where the light that enters the camera through the main lens system for image recording purposes is employed for such control functions. For example, in one form of reflex view finder arrangement in a motion picture camera, a mirror is mounted on the rotatable shutter element and reflects a portion of the light into a view finding system during the period that the shutter closes the aperture. In another view finding arrangement a beam splitter is used which deflects a percentage of the light for view finding purposes. These arrangements introduce complexities and require additional space and the latter reduces the amount of light available for image recording purposes, thus necessitating increased aperture and lens element dimensions. Due to such limitations and to the requirement for a compact camera, the conventional eight-millimeter motion picture camera utilizes light responsive control systems entirely separate from the photographic lens system.

Accordingly, an object of this invention is to provide a novel and improved structure enabling light entering the camera through the main lens system to be utilized in the control of the camera operation.

Another object of this invention is to provide a novel and improved light responsive camera control arrangement particularly useful in hand held motion picture cameras of the eight-millimeter size.

Another object of this invention is to provide an improved view finding system employing a minute fixed structure for extracting a portion of the light passing through the lens system with substantially no reduction of the light available for image forming purposes.

Still another object of the invention is to provide means for using a portion of the light passing through the lens system for controlling the diaphragm opening in an automatic manner without diminishing the amount of light available for the image recording operation.

A further object of the invention is to provide a novel and improved electrically operated motion picture camera.

Still another object of the invention is to provide an improved motor control linkage for an elecrtically operated motion picture camera arranged to mechanically insure proper positioning of the shutter for reliable motion picture camera operation.

Another object of the invention is to provide an improved diaphragm control system for motion picture cameras.

The invention may be practiced with advantage in a motion picture camera having a main lens system through which light is admitted for image recording purposes. In the preferred embodiment this lens system includes a movable ("zoom") lens unit and a fixed ("buried") lens unit. Between these two lens units an adjustable diaphragm structure is provided to control the amount of light that is transmitted through the fixed lens unit. A small totally reflecting mirror (having an area in the order of one-tenth or less of the cross sectional area of the fixed lens unit) is fixed in position at the periphery of the beam of light formed by the movable lens unit. This small mirror reflects the impinging portion of the beam of light into a view finder system which produces an image for viewing by the operation of the camera. This view finder image is brighter than that obtained with beam splitting devices which are interposed across the entire beam of light in comparable arrangements, and in addition no color distortion is introduced as is common in beam splitting devices. A second small mirror of similar dimensions, also positioned at the periphery of the beam of light formed by the movable lens unit in the same plane as the first mirror but circumferentially offset therefrom, reflects the impinging portion of the beam of light onto a photoresponsive element. The resulting variable signal from that element is coupled to a galvanometer to control the size of the aperture defined by the adjustable diaphragm structure. In this manner the invention provides, in an eight-millimeter camera arranged to be hand held, control arrangements which utilize portions of the beam of light that is introduced into the camera for image recording purposes to produce an image for view finding purposes and to precisely control the diaphragm mechanism. The preferred embodiment of the invention, hereinafter described in detail, is employed in an electrically operated motion picture camera, and provides a new and improved camera, compact, reliable and versatile in operation.

Further objects, features and advantages of the invention will be seen as the following description of a preferred embodiment progresses, in conjunction with the drawings, in which.

There is shown in FIGS. 1-4 a motion picture camera constructed in accordance with principles of the invention. The camera, which is adapted to be hand held and employs eight-millimeter films, has a case 10 on which is supported at its forward end a zoom lens structure 12. That structure includes a lens unit movable forwardly and rearwardly by motor 14 and drive mechanism 16 that are described in greater detail hereinafter. On the left side wall of the camera case is a hinged door 18 which permits access to a film holding compartment which receives a film supply reel 20 and a takeup reel 22 in the positions indicated in dotted lines. The path of the film from the supply reel to the takeup reel is indicated generally by dashed line 24. The door 18 is secured by a latch 26 positioned on the wall of the case. Forward of the latch is a Type A filter control lever 28. Immediately below the lens system at the front of the case is a main camera operation control lever 30 and at the top of the case is a zoom lens control switch 32. As indicated in dotted lines in FIG. 1 the view finder system includes a tube 34 extending rearwardly to eye piece 36 that protrudes from the rear of the camera case.

Figure 1:
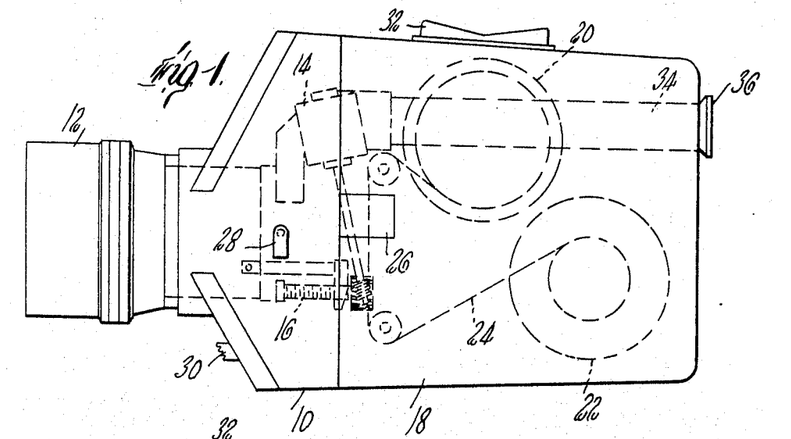
FIG. 1 is a view of the left hand side of a motion picture camera constructed in accordance with principles of the invention.
Figure 2:
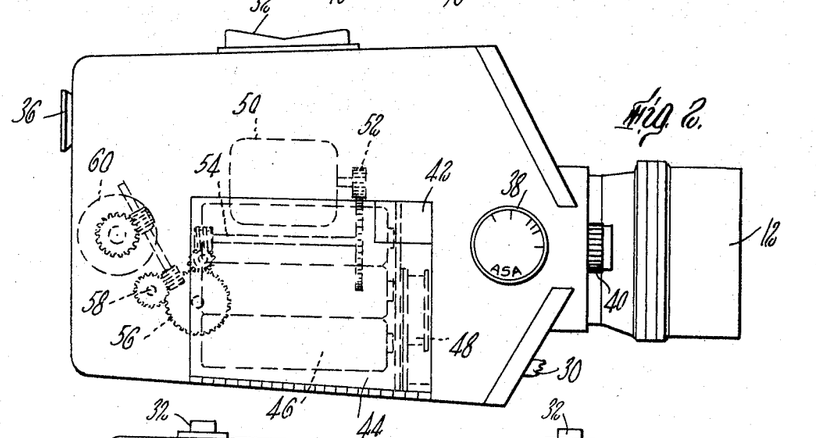
FIG. 2 is a view of the right hand side of the motion picture camera shown in FIG. 1.

On the right side of the camera case, as indicated in FIG. 2, is mounted an ASA control knob 38 through which compensation for various types of film in the automatic diaphragm control system is provided. Immediately forward of the ASA control knob is a manual-automatic control knob 40, and to the rear of the knob 38 is door latch 42 which secures door 44 that is hinged at the bottom of the case. Inside this door is secured the power supply for the camera: five conventional batteries 46 which supply power for the drive systems of the camera and a mercury cell 48 which supplies power for the aperture control system. Also shown in FIG. 2 in dotted lines is the location of the main drive motor 50 which is coupled through a gear train 52 to a main drive shaft 54. At the rear end of the drive shaft 54 is a second gear train 56 which drives the takeup reel 22 through shaft 58 and also drives a film footage indicator 60.

Figure 3:
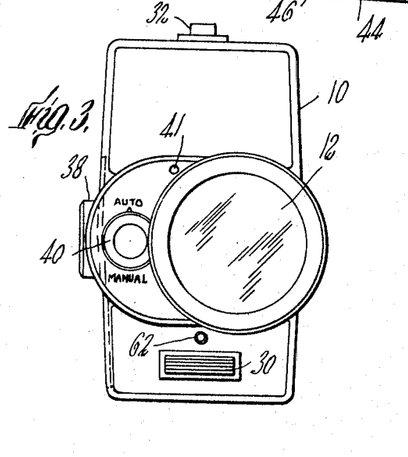
FIGS. 3 and 4 are front and rear views respectively of the motion picture camera shown in FIG. 1.
Figure 4:
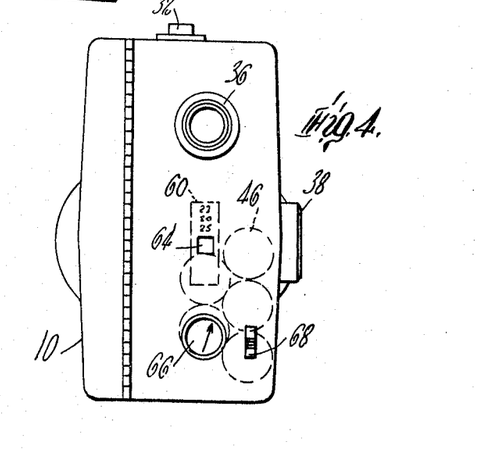

With reference to FIG. 3, the position of several of the control elements above mentioned are shown in front view. In addition, there is provided immediately below the lens unit 12 a cable release attachment in the form of a threaded bushing 62 which receives a cable element for controlling the single frame operation of the camera. As shown in FIG. 4 on the rear wall of the camera the eye piece 36 for the view finder system is supported. Immediately below the eye piece is a window 64 which enables the camera operator to read the film footage indicator 60 and below the film footage indicator window is a meter 66 which provides an indication of the quality of the batteries 46 in the camera.

Figure 5:
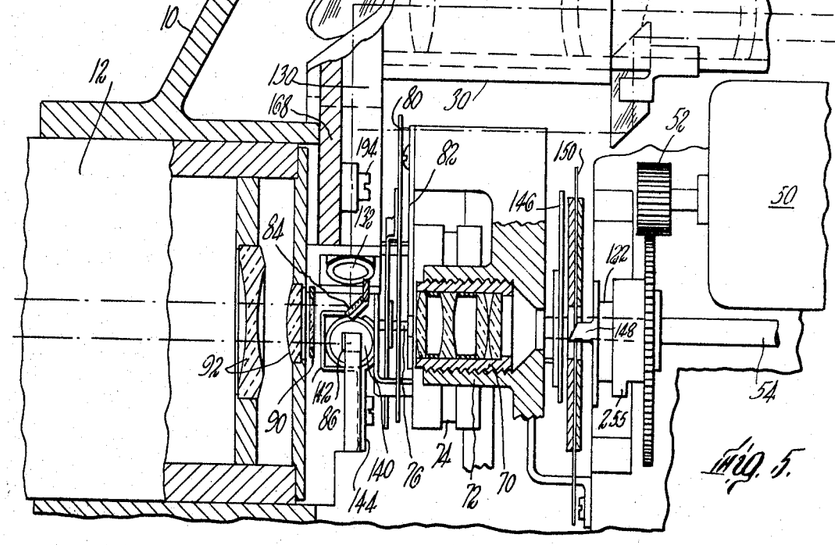
FIG. 5 is a partly diagrammatic sectional view of the motion picture camera illustrating the view finding and diaphragm control structures in their relation to the main photographic lens system thereof.

A portion of the lens system and adjacent structure of the camera is shown in FIG. 5. That system includes an objective lens unit 70 secured in threaded relation in supporting member 72. Immediately to the side of that lens unit is a galvanometer 74 which drives an output shaft 76 on which is mounted an arm 78 that supports a movable diaphragm vane 80. That vane has an arcuately extending aperture and cooperates with a stationary vane structure 82 positioned immediately in front of the objective lens to define the variable iris opening for the image recording operation.

Forwardly of the movable vane element 80 are positioned two small mirrors 84, 86. Each mirror is a totally reflecting front surfaced element which is supported in fixed relation to lens unit 70 and reflects a portion of the light transmitted through the zoom lens unit. In front of the mirrors in the optical path is a Type A filter structure 90 that may be moved in to or out of the optical path as desired by the operator of the camera, and forward of the Type A filter is the zoom lens unit 12 including movable lens elements 92, that is supported in the camera case. The arm 94 supporting the Type A filter 90 is mounted for pivoting movement on shaft 96 (FIG. 6).

Figures 6, 7:
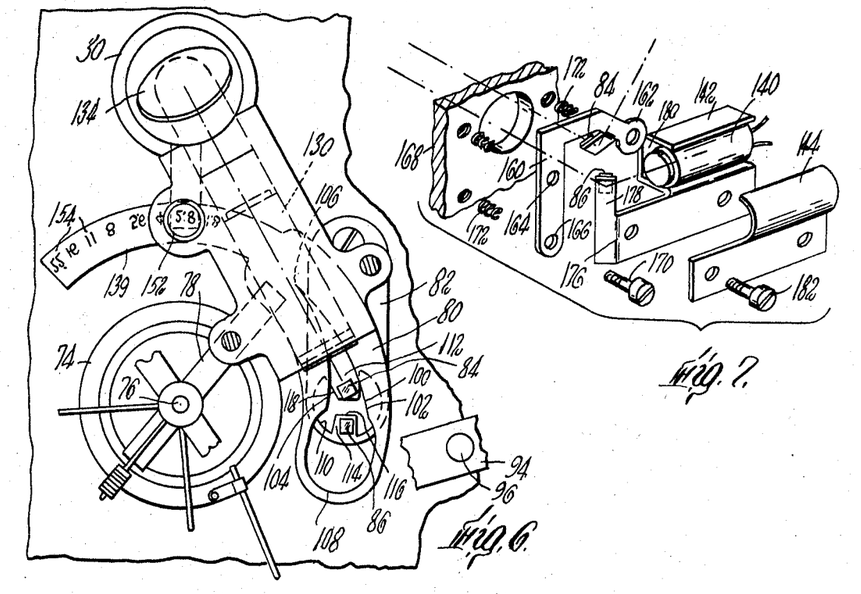
FIG. 6 is a diagrammatic view of the diaphragm control system and certain adjacent components.
FIG. 7 is an exploded view of the mirror support structures employed in the view finding and diaphragm control systems.

Additional features of the configuration of the movable vane and cooperating stationary vane are shown in FIG. 6. The movable vane 80 has an arcuately configured opening 100 formed with uniformly curved side walls 102, 104 which taper to a vertex 106. At the opposite end of the opening a wide bulge 108 is provided in the aperture to insure that all the light passing through the lens system when the movable vane is in its wide open position will impinge on the stationary vane element 82. That stationary vane has a generally circular aperture 110. Extending into that aperture are two tabs 112, 114 that are mounted substantially on the arcuate center line of the movable vane aperture 100. Each tab has a straight edge 116 parallel to the straight edge on the other tab symmetrically located with respect to the center of the aperture 110. The side walls 118 of each tab may be inclined at a slight angle as a function of their radius from the center of rotation of the galvanometer structure 74 which drives the movable vane and the curvature of the walls 102, 104 of that vane so that the reduction of light available to the film due to the tabs is minimized.

These tabs cooperate with the movable vane aperture to better define an acceptable diaphragm opening at relatively small diaphragm opening values (e.g. $f/16$). As these tabs are present, the mirror 84 is mounted immediately in front of vane tab 112 and mirror 86 is mounted immediately in front of vane tab 114. In this manner the provision of these small mirrors in the optical path of the light system, does not remove any light from the system that would impinge on the film but rather utilizes that portion of the light which would have been otherwise wasted for view finding purposes and also for purposes of controlling the size of the diaphragm opening. The size of each mirror in this embodiment is 0.094″ x 0.094″ with the stationary vane having an aperture diameter of 0.285″. Mirrors one millimeter square have been employed in the system and give satisfactory images (although of reduced brightness). The mirrors are positioned at the periphery of the beam of light passed by the adjustable zoom lens assembly at points where there is no objectionable vignetting effect over the permissible range of movement of that lens assembly. The mounting of the mirrors at the periphery of the entering light beam is such that a minimum amount of light (in this case substantially none) is removed from the system, making it possible to use the same size of optical components as heretofore employed while providing the operator of the camera with an image for viewing from exactly the same source as will be employed for recording on film, and also employing light passing through the optical system of the camera for controlling the size of the diaphragm opening in an automatic and precise manner.

Light impinging on the upper mirror 84 is reflected at an angle upwardly through a view finder system including a first lens tube 130 having an aperture 132 through which light from the mirror 84 is directed for reflection by mirror 134 rearwardly through view finder tube 30 that includes lenses 136 to eye piece 36 (not shown in FIG. 5), secured on the end of the view finder tube. This finder system, which has an aperture of about f/8 produces brighter images from the small mirror 84 than do comparable beam splitter arrangements which remove in the order of 20% of the light from the optical system. In addition, there is no color distortion as commonly experienced with beam splitters. (A prism 138, secured to the view finder tube 30, directs light from an aperture opening indicator portion 139 carried by movable vane 80 to the view finder tube 30 for display in conjunction with the view to which the camera is exposed.)

The lower mirror 86 reflects light impinging thereon, horizontally at right angles to its incident direction onto a photoconductor element 140 secured in holder 142 by clamping member 144.

To the rear of the objective lens is a shutter mechanism 146 driven by shaft 54 through the gear train 52 and motor 50. Also mounted on shaft 54 is an eccentric cam 122 which engages a claw structure 148 to reciprocate the claw for drawing film 150 past the image aperture in an intermittent fashion for recording of images in conventional manner.

The movable vane element further includes extension 139 which is movable past a tube 152. The tube 152 is aligned with aperture 41 in the front wall of the camera case and the vane extension moves between that aperture and the tube. On this transparent extension 139 of the movable vane are marked F stop numbers 154 which provide an image for translation through the tube 152 of acrylic resin such as that sold under the trademark "Lucite" or other suitable light conducting material for direction by prism 138 into the view finder tube so that the operator of the camera may have an indication of the aperture setting of the camera.

The structure for supporting and aligning the mirrors 84, 86 is shown in FIG. 7. The view finder mirror 84 is supported by an angular metal plate 160 having three support points 162, 164, 166, located at approximately the apices of an equilateral triangle. Each support point is secured to a support wall 168 by a screw 170 with a spring 172 between the bracket 160 and the wall 168. By adjusting the screws 170 against the biasing force of springs 172 the angle of mirror 84 may be adjusted so that entering light is reflected into the view finder system so that the desired view may be observed at the eye piece 36. The aperture controlling system mirror 86 is secured to an extension 176 of the photocell support bracket 142. A portion 178 of the extension is bent at an angle of 45° and at its upper end is secured mirror 86. The opposite end of the bracket 142 has an offset portion 180 which receives photocell 140 in alignment with the mirror 86 so that the mirror and photocell may be assembled as a unit, properly aligned and then secured in place by screws 182 which hold the clamping member 144 in position and secure the assembly on the supporting wall 168.

Figures 8, 9, 10:
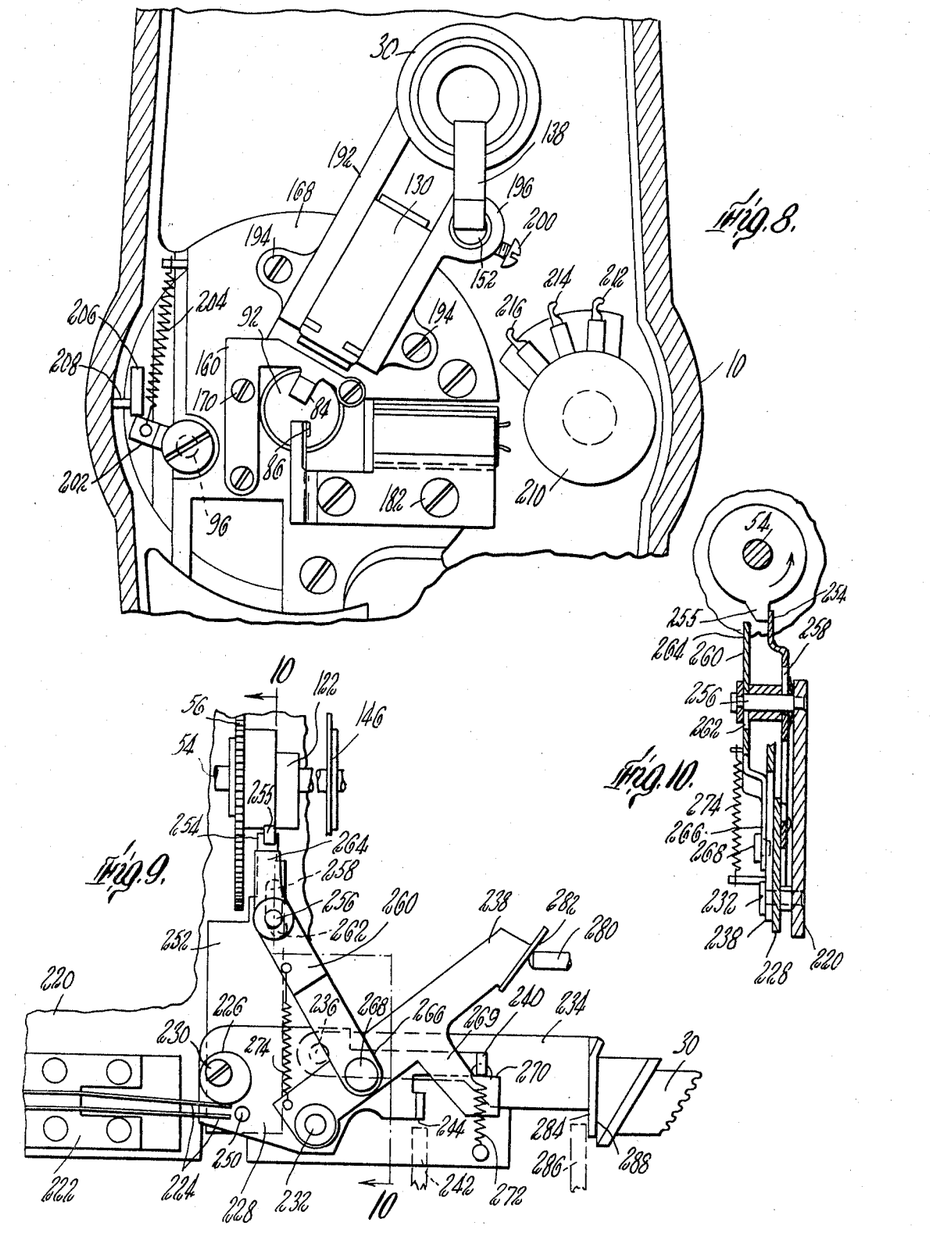
FIG. 8 is a view of the structure shown in FIG. 6 looking forward from a point immediately in front of the diaphragm control apparatus.
FIG. 9 is a diagrammatic view of the motor and shutter control linkage employed in the motion picture camera shown in FIG. 1.
FIG. 10 is a sectional view taken along the line 10—10 of FIG. 9.

A view of the two mirrors 84, 86 from a point immediately in front of the galvanometer structure looking toward the zoom lens unit is shown in FIG. 8. The rear lens 92 of that unit is visible in this figure. Mounted on the camera case framework wall interposed between the rear end of the zoom lens unit and the view finder structure is a holder 192 for lens tube 130 which is secured by screws 194. That lens holder also includes a holder portion 196 which receives the light transmitting tube 152 which is secured therein by set screw 200. As indicated above, this tube is aligned with the light admitting aperture 41 so that an indication of the exact current aperture setting is displayed in the view finder for the information of the camera operator. (The prism 138, while actually being positioned substantially behind the location of the other elements shown in this figure, is illustrated in order to better indicate its relation to these components.)

The Type A filter 90, mounted on shaft 96, has a lever extension or tab 202 on the opposite side which is biased upwardly by spring 204 secured to the camera framework to a position out of alignment with the optical path of the camera lens system. A cam member 206 connected by shaft 208 to the actuating lever 28 on the case wall may be rotated to force tab 202 down, with the result that the filter member may be moved into the optical path as desired. On the opposite side of the optical unit from the Type A filter actuating mechanism is a variable resistor unit 210 having terminals 212, 214, 216 for connection to electrical circuitry which is used for controlling the position of the diaphragm manually. This variable resistor element has a detent position at which the automatic diaphragm control is operative and is otherwise continuously variable through a range of resistances to provide the desired range of manual control over the diaphragm opening.

The operation control mechanism employed in this camera is shown in FIGS. 9 and 10. This mechanism is a mechanical linkage, constructed to insure proper timed control for the energization and de-energization of the electric drive motor 50 with resulting accurate positioning of the shutter 146. With this mechanism no complex electrical delay or commutator arrangements are required. The mechanism is mounted on a framework member 220 and includes a motor control switch unit 222 having contacts 224. The closing and opening of these contacts are controlled by an eccentrically mounted contact operating disc member 226 of suitable electrical insulating material. That disc member is secured to a pivotally mounted plate 228 by screw 230. Plate 228 is secured to frame 220 by pivot pin 232 and is caused to rotate about that pivot point by action of coupling member 234 secured to plate 228 by pin 236; by the action of lever member 238 which acts against offset tab member 240 on plate 228; or by an auxiliary actuating member 242 which may be mounted in a pistol grip unit secured to the bottom of the camera and which moves upwardly against the surface 244. The member 234 has formed at its forward end the actuating surface of control lever 30. Rearward movement of that surface acts against pin 236 to rotate the actuating plate 228 in a counterclockwise direction (as viewed in FIG. 9) about its pivot point 232 to close the motor control contacts 224.

Also connected to the plate 28 by pin 250 is a vertically reciprocable member 252 which at its upper end 254 functions as a stop that engages the shutter positioning control projection 255. With the counterclockwise rotation of plate 228 member 252 is pulled downward to release projection 255 and permit the shutter 146 and shaft 54 to rotate. The member 252 is secured for reciprocation relative to the frame 220 by stud 256 which extends through an elongated slot 258 in member 252. Also mounted on the stud 256 is a second reciprocable member 260 which functions as an auxiliary stop and has a similar elongated slot 262 therein. The upper end 264 of this member is a stop surface and its lower end 266 is pinned to actuating lever member 238 by pin 268. This actuating lever 238 is secured to the frame 220 by pin 232 and hence rotates about the same point as plate 228. The lever includes arm 269 extending at right angle from the side opposite link 260 terminating in a seating surface 270 on which the offset tab member 240 of actuating plate 228 is maintained in seated relation by spring 272 (secured to the frame 220).

In operation when the surface of control lever 30 is moved towards the camera case, link 234 acts upon pin 236 to rotate plate 228. Through adjustment of the contact actuating disc member 226 the contacts are closed at an established position. During this itnerval the stop member 252 is also being moved downwardly to move the stop surface 254 away from projection 255 to permit rotation of the shaft 54. However, the circuit is adjusted so that the shutter shaft 54 is not freed to rotate until after the motor circuit has been completed. The same type of operation may be produced by the vertically acting pistol grip actuating rod 242 which engages the surface 244 to rotate the plate 228 counterclockwise to initially close the motor circuit and then to release the shutter shaft. When either of these control surfaces is released plate 228 is rotated in a clockwise direction under the influence of spring 272, which rotation is effective to raise stop member 252 so that the surface 254 prevents further rotation of the shaft 54 before the motor circuit is opened. This coordination of control insures that the shutter stop projection 225 will be in engagement with surface 254, thereby properly positioning the shutter 146.

In single frame operation, the actuator member 280 from the cable release attachment contacts the forward surface 282 of lever 238. This contact urges the lever in the counterclockwise direction about the pivot 232. This rotation raises member 260 into a position in the path of the shutter shaft projection 255. At the same time the extension arm 269 is acting against the seating tab member 240 to rotate plate 228, which operation causes contacts 228 to be closed and also to release the stop provided by member 252. The timing of this mechanical movement is coordinated so that the motor circuit is first closed, the auxiliary shutter control member 260 is raised into stop position and finally the main shutter control member 252 is lowered to permit rotation of the shaft. The projector 255 contacts stop surface 264 after slightly less than one complete revolution and in this manner a single frame operation of the camera is achieved. Upon release of actuator 280, the main stop 252 is raised, the auxiliary stop 260 released, and after the projection 255 has rotated into contact with the main stop, the motor circuit is opened. Thus this simple mechanical linkage controls the time of energization and de-energization of the motor 50, both for single frame operation and for continuous operation so that the proper positioning of the shutter 146 to close the image aperture and thus prevent possible damage to the film from light entering the camera case through the optical system is insured.

A vertical surface 284 rearwardly of the operating button surface 30 on the link 234 cooperates with a lock member 286 which may be rotated up into position as indicated by the dotted lines to positively lock the mechanism and prevent inadvertent operation of the camera. (This single lock member 286 may also engage the forward surface 288 to lock the mechanism in released condition for remote operation as described hereinafter.)

Figure 11:
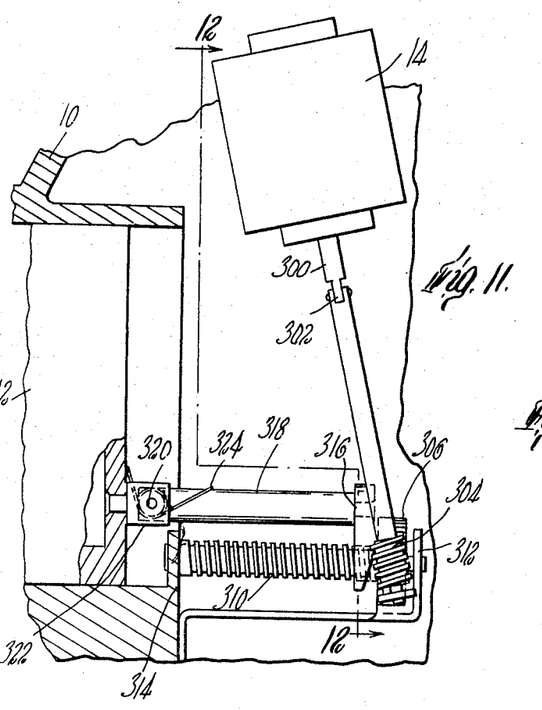
FIG. 11 is a view of a zoom lens adjusting mechanism employed in the motion picture camera of FIG. 1.
Figure 12:
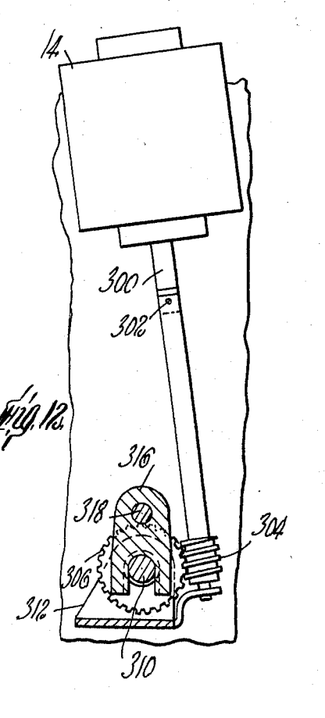
FIG. 12 is a sectional view of the zoom lens adjusting mechanism taken along the line 12—12 of FIG. 11.

The motor 14 and associated mechanism which controls the positioning of the zoom lens structure 12 is shown in FIGS. 11 and 12. As shown in those figures, the small DC reversible motor 14 has its output shaft 300 coupled through a universal joint 302 to miter gear 304 which engages spur gear 306. This spur gear is mounted on a threaded drive shaft 310 which is supported for rotation by framework members 312 and 314. Half nut 316 cooperates with shaft 310 and drives rod 318 which is secured to the zoom lens structure by a pin 320 and clevis 322. Spring 324, acting between the zoom lens structure and the top of the rod 318, biases the rod in clockwise direction as viewed in FIG. 11 to maintain the half nut in engagement with shaft 310. In operation, rotation of the motor 14 drives shaft 310 and the coupling action of the threads moves the half nut 316 axially along the shaft. At the end of the shaft, if the motor remains energized, the half nut will ride up out of the threads, as permitted by the pivoted mounting of the rod 318 so that the nut no longer is in engagement with the threads and the shaft is free to rotate. The spring 324 biases the half nut downwardly into engagement with the threads, however, and should the motor be energized for rotation in the reverse direction the half nut configuration is such that it will be forced into driving engagement with the threads by spring 324 and will move the zoom lens assembly 12 in the opposite direction.

Figure 13:
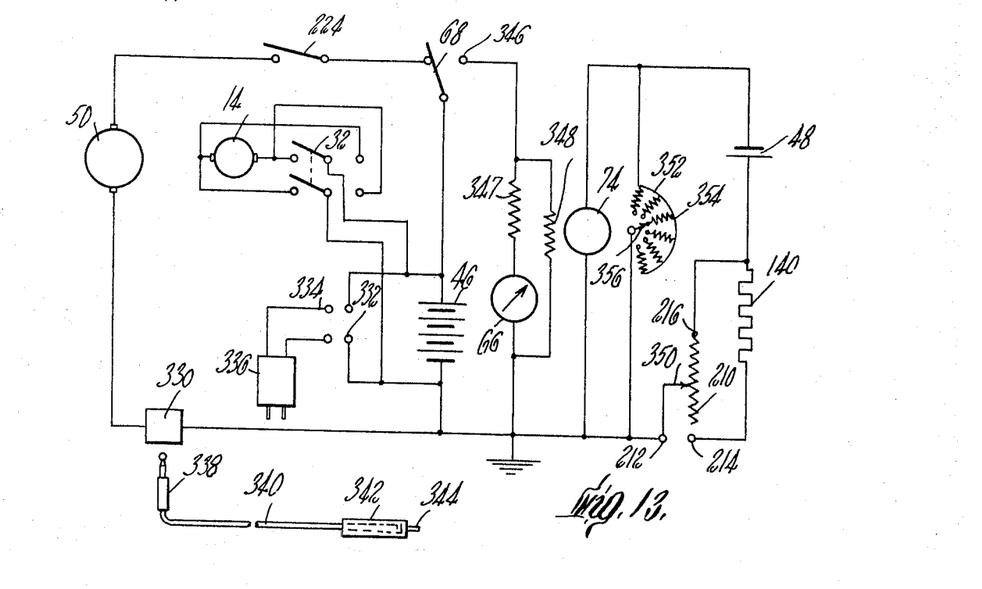
FIG. 13 is a schematic diagram of the electrical circuitry employed in the motion picture camera shown in FIG. 1.

The camera control circuitry is shown in the schematic diagram of FIG. 13. The camera drive motor includes a circuit connected from the five cell battery 46 through test switch 68 and switch contacts 224 (operated by the main control element 30 or by the single frame mechanism) to the motor 50, and from the motor 50 back through a jack receptacle 330 located on the bottom of the camera case to the battery. In this circuit when the switch 68 is in the operate position (as shown in FIG. 13) and contacts 224 are closed, the motor is energized to permit operation of the camera including rotation of the shutter and passing of the film past the image aperture. A circuit for controlling the zoom lens drive motor 14 is also connected across the battery 46 to double pole-double throw switch 32. There is also provided on the camera case connectors 332 which receive plug element 334 connecting a battery recharging device 336 to the circuitry. That device 336 may be plugged into an ordinary 110 volt AC domestic service to recharge the batteries 46. Remote control operation is provided by means of jack 338 which plugs into the receptacle 330. Plugging in the jack opens the motor control circuitry at that point. To operate the camera remotely the motor contacts 224 are closed by locking the link 234 in its rearward position (after the jack has been inserted) by means of lock member 286 which engages the surface 288 of the link 234 (FIG. 9). In this position the shutter shaft 54 is unlocked and contacts 224 are closed but the motor circuit is open due to the operation of the jack inserted in the receptacle 330. The jack is connected by a cord 340 of suitable length to a switch unit 342 having a push button 344. When the push button is depressed the switch in the unit 342 is closed, completing the motor circuit to operate the camera.

As it is desirable to test the battery voltage periodically to insure that there is sufficient voltage to operate the camera drive motor at proper speed, switch 68 is provided. To test, this switch is moved from its position shown in FIG. 13 to the terminal 346, connecting battery 46 in series with the meter 66, which circuit includes resistances 347 and 348. The meter is calibrated to provide an indication to the camera operator whenever the battery voltage is too low. At that time the batteries should be recharged or replaced.

The diaphragm control circuit provides a signal to the galvanometer 74 from mercury cell 48. The manual-automatic selector element has a movable arm 350 coupled to knob 40 which is shown in the manual position in FIG. 13. When it is moved to the detent position in contact with terminal 214, the cadmium selenide photoresistive element 140 is connected in circuit between cell 48 and the galvanometer. The resistance of this photoresponsive element changes as a function of the light impinging thereon and light transmitted through the zoom lens unit is directed onto the sensitive area of that element by mirror 86. The resistance of element 140 thus provides a precise indication of the amount of light available in the optical system of the camera for image recording purposes and the resulting current provides a torque to rotate the galvanometer 74 and the aperture controlling vane to a position as a function of this amount of light.

When manual operation is desired the movable member 350, which is controlled in position by knob 40, is moved from terminal 214 onto the resistive element, opening the circuit to the photoresistor 140, and a manually variable amount of resistance is placed in the circuit to control the current flowing to the galvanometer 74. In this manner the position of the vane may be controlled as desired by the operator of the camera through rotation of knob 40. The F stop opening of the diaphragm may be ascertained by the camera operator through the indicator system mounted on the movable vane extension 139 as above described.

An attenuation switch 352 having six graded resistors 354 connected to it is also connected in the galvanometer circuit. The adjustable resistor selector member 356 is controlled by knob 38 and selects one of those graded resistors for connection across the galvanometer to provide compensation for different film types.

Thus the camera constructed in accordance with the principles of the invention provides an accurate diaphragm positioning system utilizing light passing through the camera optical system to control the diaphragm opening. As a small totally reflecting mirror, positioned at the periphery of the entering light beam, is utilized, this control is accomplished with little diminution of light available for image recording purposes and in the arrangement of the disclosed embodiment, no light is lost. In addition, a similarly mounted mirror, also at the periphery of the light beam, directs another portion of the entering light beam into a view finder arrangement so that the same view to which the film will be exposed may be discerned by the camera operator. It will be seen that the invention provides significant control advantages in a compact hand held camera with no increase in size or complexity and without diminishing the versatility of operation of the camera.

While a preferred embodiment of the invention has been shown and described various modifications thereof will be obvious to those skilled in the art, and therefore it is not intended that the invention be limited to the disclosed embodiment or to details thereof and departures may be made therefrom within the spirit and scope of the invention as defined in the claims.

I claim:
1. In a camera, the combination comprising means forming an image aperture,
    first and second lens units positioned in front of said image aperture,
    an image recording medium positioned behind said image aperture,
    variable diaphragm means positioned between said lens units, said variable diaphragm means including a stationary vane structure and a movable vane structure,
    said stationary vane structure defining a generally circular aperture with a tab portion extending inwardly from the periphery of the said aperture and said movable vane structure defining an aperture of graduated dimension,
    said first lens unit transmitting a beam of light of predetermined area directed toward said variable diaphragm means for transmission through said variable diaphragm means and said second lens unit to said image aperture for recording on said image recording medium,
    totally reflecting means positioned at the periphery of said beam of light in alignment with said tab portion and in front of said variable diaphragm means,
    and a view finder system optically coupled to said reflecting means for forming an image from the portion of said beam of light impinging on said reflecting means for viewing by the camera operator.
2. In a camera, the combination comprising means forming an image aperture,
    first and second lens units positioned in front of said image aperture,
    an image recording medium positioned behind said image aperture,
    variable diaphragm means positioned between said lens units, said variable diaphragm means including a stationary vane structure defining a generally circular aperture having a tab portion extending inwardly from the periphery of said aperture and a movable vane structure defining an aperture of graduated dimension,
    said first lens unit transmitting a beam of light of predetermined area directed toward said variable diaphragm means for transmission through said variable diaphragm means and said second lens unit to said image aperture for recording on said image recording means,
    totally reflecting means positioned at the periphery of said beam of light in alignment with said tab portion and in front of said variable diaphragm means,
    photoresponsive means optically coupled to said reflecting means for producing an electrical signal as a function of the magnitude of the portion of said beam of light impinging on said reflecting means,
    and means for coupling said electrical signal to said movable vane structure for controlling the size of the diaphragm as a function of the light entering the camera through said first lens unit.
3. A motion picture camera including a case,
    a movable lens unit mounted on the front wall of said case,
    a fixed lens unit positioned in optical alignment with said movable lens unit inside said case,
    means forming an image aperture behind said fixed lens unit,
    motor means for advancing photographic film past said image aperture in an intermittent manner,
    rotatable shutter means disposed between said fixed lens unit and said image aperture and coupled to said motor means,
    diaphragm means positioned between said movable and fixed lens units including a stationary vane structure defining a generally circular aperture having a tab portion extending inwardly from the periphery thereof and a movable vane structure defining an aperture of graduated dimension,
    a galvanometer connected to said movable vane for controlling the position thereof,
    a totally reflecting front surfaced mirror positioned in front of said diaphragm means in alignment with said tab portion at the periphery of the beam of light transmitted by said movable lens unit,
    said mirror having an area of reflecting surface that is small relative to the area of said fixed lens unit,
    a photoconductor element optically coupled to said mirror,
    said photoconductive element having an electrical resistance characteristic that changes as a function of the magnitude of the portion of said beam of light reflected onto it by said mirror,
    a variable resistance element,
    a source of electrical energy connected to said photoconductive element and to said variable resistance element,
    switch means to selectively place said variable resistance element and said photoconductive element in circuit between said source of electrical energy and said galvanometer to energize said galvanometer for positioning said movable vane,
    and control means for operating said motor to advance film past said image aperture in a picture recording operation.
4. A motion picture camera including a case,
    a movable lens unit mounted on the front wall of said case,
    a fixed lens unit positioned in optical alignment with said movable lens unit inside said case,
    means forming an image aperture behind said fixed lens unit, motor means for advancing photographic film past said image aperture in an intermittent manner, rotatable shutter means disposed between said fixed lens unit and said image aperture and coupled to said motor means, diaphragm means positioned between said movable and fixed lens units including a movable vane having an aperture of graduated dimension, a first totally reflecting front surfaced mirror positioned in front of said diaphragm means at the periphery of the beam of light transmitted by said movable lens unit, a second totally reflecting front surfaced mirror arcuately displaced from said first mirror positioned in front of said diaphragm means at the periphery of the beam of light transmitted by said movable lens unit, each of said mirrors having an area of reflecting surface that is small relative to the area of said fixed lens unit, a view finder system optically coupled to said first mirror for forming an image from the portion of said beam of light impinging on said first mirror adjacent the rear of said camera case, and means including a photoresponsive element optically coupled to said second mirror for controlling the position of said movable vane as a function of the light entering said case through said movable lens unit.

5. A motion picture camera including a case, a movable lens unit mounted on the front wall of said case, a fixed lens unit positioned in optical alignment with said movable lens unit inside said case, means forming an image aperture behind said fixed lens unit, a first source of electrical energy, electric motor means for advancing photographic film past said image aperture in an intermittent manner, rotatable shutter means disposed between said fixed lens unit and said image aperture and coupled to said electric motor means, means to mechanically lock said shutter means against rotation, diaphragm means positioned between said movable and fixed lens units including a stationary vane having a generally circular aperture and a movable vane having an aperture of graduated dimension, a galvanometer connected to said movable vane for controlling the position thereof, a first totally reflecting front surfaced mirror positioned in front of said diaphragm means at the periphery of the beam of light transmitted by said movable lens unit, a second totally reflecting front surfaced mirror arcuately displaced from said first mirror positioned in front of said diaphragm means at the periphery of the beam of light transmitted by said movable lens unit, each of said mirrors having an area of reflecting surface that is small relative to the area of said stationary vane aperture, a view finder system optically coupled to said first mirror for forming an image from the portion of said beam of light impinging on said first mirror adjacent the rear of said camera case, a photoconductor element optically coupled to said second mirror, said photoconductive element having an electrical resistance characteristic that changes as a function of the magnitude of the portion of said beam of light reflected onto it by said second mirror, a variable resistance element, a second source of electrical energy connected to said photoconductive element and to said variable resistance element, switch means to selectively place said variable resistance element and said photoconductive element in circuit between said second source of electrical energy and said galvanometer to energize said galvanometer for positioning said movable vane, and control means for releasing said mechanical shutter lock and connecting said electric motor to said first source of electrical energy for operating said motor to advance film past said image aperture in a picture recording operation.

6. The motion picture camera as claimed in claim 5 wherein the generally circular aperture of said stationary vane has two inwardly extending tab portions, said first mirror is positioned in front of and in alignment with one of said tab portions and said second mirror is positioned in front of and in alignment with the other of said tab portions.

7. The motion picture camera as claimed in claim 6 and further including filter means selectively interposable between said movable lens unit and said diaphragm means in front of said mirrors.

8. A motion picture camera having an image aperture, an image recording medium positioned behind said image aperture, diaphragm means positioned in front of said image aperture, said diaphragm means including a stationary vane structure defining a generally circular aperture with two tab portions extending inwardly from the periphery of said aperture and a movable vane structure defining an aperture of graduated dimension, first and second lens units positioned in front of said image aperture in alignment with said diaphragm means for transmitting a beam of light through said image aperture to said image recording medium, a first totally reflecting front surfaced mirror means interposed between said first and second lens units for extracting a first minor fraction of the beam of light passing through said first lens unit to produce an image for view finding purposes and a second totally reflecting front surfaced mirror means interposed between said first and second lens units for extracting a second minor fraction from the beam of light passing through said first lens unit for controlling said diaphragm means, said first and second mirror means being positioned in front of said diaphragm means and in alignment with corresponding ones of said tab portions, so that a major fraction of the beam of light passing through said first lens unit is passed through said second lens unit and said image aperture for image recording purposes.

9. In a camera, an objective means defining an optical axis, a movable diaphragm blade disposed within said objective and having a tapered opening, at least one stationary mask disposed in said objective, said movable diaphragm blade being arranged closely adjacent said stationary mask, the latter defining jointly with said movable diaphragm blade a diaphragm aperture of said objective, a viewfinder comprising an optical system, and a mirror coated surface disposed in front of and aligned with said stationary mask, said mirror coated surface being inclined to said optical axis of said objective and reflecting light rays received by the mirror coated face out of the path of rays of said objective and to said optical system of said viewfinder, the latter forming an image of the object to be taken.

10. The camera, as set forth in claim 9, wherein the optical axis of said optical system of said viewfinder is disposed parallel to the optical axis of said objective, a mirror in said optical system of said viewfinder,
said mirror coated surface being disposed within the rays impinging upon said objective with the center of gravity of said mirror surface set off the optical axis of said objective,
a part of said objective being disposed in front of said mirror coated surface and forming a virtual image of the object at a finite distance,
the rays originating from the axial point of said image and running through the center of gravity of said mirror coated surface, and
said rays forming an angle with said optical axis of said objective.

References Cited

UNITED STATES PATENTS

| | | | |
|---|---|---|---|
| 3,124,033 | 3/1964 | Freudenschuss | 352—141 |
| 3,170,159 | 2/1965 | Goldberg et al. | 352—141 |
| 3,180,241 | 4/1965 | Mikusch et al. | 95—64 |

NORTON ANSHER, *Primary Examiner.*

JOSEPH F. PETERS, Jr., *Assistant Examiner.*

U.S. Cl. X.R.

95—10, 64